United States Patent
Mottram et al.

(10) Patent No.: US 6,692,788 B1
(45) Date of Patent: Feb. 17, 2004

(54) COMPOSITIONS FOR IMPROVING THE ORGANOLEPTIC QUALITIES OF COOKED FOODSTUFFS

(75) Inventors: Donald Stewart Mottram, Thatcham (GB); Jennifer Marjorie Ames, Reading (GB); Jerzy Aleksander Mlotkiewicz, Geneva (CH); Jonathan Paul Copsey, Newmarket (GB); Adam Anderson, Cheltenham (GB)

(73) Assignee: Kerry Ingredients (UK) Limited, Surrey (GB)

( * ) Notice: Subject to any disclaimer, the term of this patent is extended or adjusted under 35 U.S.C. 154(b) by 0 days.

(21) Appl. No.: 09/405,070

(22) Filed: Sep. 27, 1999

Related U.S. Application Data

(63) Continuation of application No. PCT/GB98/00796, filed on Mar. 18, 1998.

(30) Foreign Application Priority Data

Mar. 26, 1997 (GB) ................................................ 9706235

(51) Int. Cl.$^7$ ................................................ A23L 2/56
(52) U.S. Cl. ........................ 426/533; 426/89; 426/534; 426/650
(58) Field of Search ............................ 426/533, 89, 96, 426/98, 99, 103, 535, 534, 536, 537, 650

(56) References Cited

U.S. PATENT DOCUMENTS

| | | | |
|---|---|---|---|
| 3,782,973 | A | 1/1974 | Pittet et al. |
| 4,464,409 | A | 8/1984 | de Rooij |
| 5,264,239 | A | 11/1993 | Cornet et al. |
| 5,480,663 | A | 1/1996 | Heyland et al. |

FOREIGN PATENT DOCUMENTS

| | | | |
|---|---|---|---|
| BE | 561423 | | 4/1958 |
| BE | 561424 | | 4/1958 |
| EP | 0 001 309 | | 4/1979 |
| EP | 0571031 | * | 11/1993 |
| EP | 0 571 031 | | 11/1993 |
| EP | 0 784 936 | | 7/1997 |
| GB | 858660 | | 1/1961 |
| GB | 1069104 | * | 3/1966 |
| GB | 1069104 | | 5/1967 |
| GB | 1283912 | * | 7/1969 |
| GB | 1283912 | A | 8/1972 |
| WO | 90/12506 | * | 11/1990 |

OTHER PUBLICATIONS

Andres, C., AN 67881 FROSTI, abstracting Food Processing, 1981, 42(12), 57.*
Van den Ouweland et al, J. Agric. Food Chem., vol. 23, No. 3, 1975, pp. 501–505.
Ames, Biochemistry of Food Proteins, Ed. Hudson, Elsevier Applied Science, London, 1992, pp. 99–143.

* cited by examiner

Primary Examiner—Leslie Wong
(74) Attorney, Agent, or Firm—Birch, Stewart, Kolasch & Birch, LLP

(57) ABSTRACT

Compositions for generating a cooked flavor in a foodstuff, comprising specified flavor precursors that react on heating to generate the flavor and maintain a reactive association after inclusion in the foodstuff. The compositions may include combination of a sulphur source, e.g. hydrogen sulphide, methane thiol, a sulfur-containing amino acid, thiamine, cystine, sodium sulphide, ammonium sulphide, ammonium polysulphide, onions, garlic, shallots, eggs, methionine, and mixtures thereof, and at least one reductone, e.g. a furanone, a ketone, a pyrone, an aldehyde, a carbonyl compound, isomaltol, maltol, pyruvaldehyde, hydroxyacetone, 3-deoxyglucosone, 5-hydroxy-5,6-dihydromaltol, 2,3-butanedione, 3-hydroxy-2-butanone, a process flavor, cooked vegetable concentrates, soy sauce, and mixtures thereof.

17 Claims, No Drawings

US 6,692,788 B1

COMPOSITIONS FOR IMPROVING THE ORGANOLEPTIC QUALITIES OF COOKED FOODSTUFFS

This application is a continuation of international application number PCTGB/98/00796, filed Mar. 18, 1998.

1. Field of the Invention

The present invention relates to compositions for generating flavours in foodstuffs, to foodstuffs incorporating such compositions and to processes for producing them. In particular, the present invention relates to compositions for generating cooked (e.g. cooked meat) flavours in a foodstuff in situ, which compositions comprise flavour precursors which react on heating to generate the flavours.

2. Background to the Invention

The Maillard reaction

The term "Maillard reaction" and "Maillard reactants/products" are terms of art which define the complex series of chemical reactions between carbonyl and amino components derived from biological systems and the associated reactants and products, respectively. The term Maillard reaction is used herein in the established broad sense to refer to these reactions, and includes the closely associated reactions which are usually coupled with the Maillard reaction sensu stricto (such as Strecker degradation).

In foods, the Maillard reaction results in both the production of flavours and browning (see Bailey, M.E. (1994) *Maillard reactions and meat flavour development*, pages 153–173, In: *Flavour of meat and meat products*, Ed. F. Shahidi, Academic Press; Ames, J. M. (1992) *The Maillard Reaction*, pages 99–143, In: *Biochemistry of Food Proteins*, Ed. B. J. F. Hudson, Elsevier App. Sci. London).

With respect to flavour generation, the Maillard reaction can be broken down into four stages. The first stage involves the formation of glycosylamines. The second stage involves rearrangement of the glycosylamines to form Amadori and Heyns rearrangement products (often abbreviated in the literature to "ARPs" and "HRPs", respectively). The third stage involves dehydration and or fission of the Amadori and Heyns rearrangement products to furan derivatives, reductones and other carbonyl compounds (which may have significant organoleptic qualities). (These "third stage products" may also be produced without the formation of ARP's or HRP's. The fourth stage involves the conversion of these furan derivatives, reductones and other carbonyl compounds into coloured and aroma/flavour compounds. Thus, products and reactants present in both the third and fourth stage of the Maillard reaction contribute towards aroma and or flavour.

Thus, the terms "Maillard reaction", "Amadori rearrangement product", "Heyns rearrangement product", "aroma compound" and "flavour compound", unless indicated otherwise, are used herein in the above-described senses.

Further, the term "post-rearrangement Maillard reactant" is intended to define Maillard reactants, intermediates and products which correspond to those which are elaborated from the Amadori and Heyns rearrangement products within the Maillard reactions which occur in (or are connected with) the third and fourth stages of the Millard reaction (as defined above). Thus, the term "post-rearrangement Maillard reactant" encompasses Maillard reactants, intermediates and products which can be (but not necessarily are) elaborated within the Maillard reaction. Thus, the term "post-rearrangement Millard reactant" covers natural and synthetic equivalents of Millard reactants, intermediates and products which are elaborated by the Millard reaction.

Thus, as used herein, the term *post-rearrangement Maillard reactant* defines those compounds which are elaborated during the Millard reaction at a point downstream of the second (rearrangement) step of the Maillard reaction (as described above), including natural and synthetic equivalents thereof.

Problems associated with reduced cooking times

In the interests of convenience and cost efficiency, it is often desirable to reduce the time and/or temperature used in the cooking of various foods. However, reduced cooking time/temperature is often associated with severe disadvantages; the flavour and aroma of the food is often impaired and browning (which may be highly desirable, e.g. in meat cookery and in baking) may not fully develop.

These problems arise because many of the chemicals which produce browning and flavour/aroma are generated as part of a complex cascading and interlinked series of chemical reactions which flow from certain components originally present in the uncooked food. The products include the aroma/flavour compounds produced via the Maillard reaction (described above). A reduction in the time over which these reactions are allowed to proceed results in truncation of the reaction pathways and accordingly a much restricted range of the end products (e.g. the aroma/flavour compounds) associated with cooked flavours and/or colours.

These problems are particularly acute with microwave cooking. Here, cooking times are drastically reduced and both browning and flavour/aroma development are accordingly severely restricted.

The problem of inadequate colour generation has been addressed in the art by the provision of various browning agents based on caramelization of sugars and/or the Mallard reaction between naturally occurring reducing sugars, amino acids, amines, peptides and proteins to form coloured melanoidins (see e.g. U.S. Pat. No. 5,091,200).

The problem of inadequate flavour/aroma generation has been addressed by the use of so-called "process flavours" (also called "finished flavours" ). These food flavouring compositions comprise various formulations of flavour/aroma compounds (often produced by controlled Maillard reaction of various selected precursors or foodstuffs in vitro) which are intended to create the flavour/aroma chemicals normally produced over the course of cooking (so compensating for their absence in uncooked/microwaved food products).

However, finished flavours may not provide a complete flavour profile. For example, aromas/flavours associated with volatile compounds may be present at a reduced level (having been lost during the preparation process). Moreover, many components of the finished flavour may be flashed off during cooking (so leading to loss from the flavour profile of important aroma volatiles).

It is therefore an object of the present invention to provide materials and methods for efficiently generating cooked flavours and aromas (and optionally colours) in foods which at least partially overcomes the aforementioned problems associated with finished (process) flavours.

SUMMARY OF THE INVENTION

According to the present invention there is provided a composition for generating a cooked flavour in a foodstuff, the composition comprising (or consisting essentially of) flavour precursors, which precursors react on heating to generate the flavour, maintain a reactive association after inclusion in the foodstuff and comprise a sulphur source and/or an amino acid together with one or more reductones.

As used herein, the term "flavour precursor" is intended to define compounds or chemical moieties which can take part in one or more reactions which yield products which contribute to a cooked flavour in a food. Such flavour precursors therefore need not be flavouring compounds per se.

As used herein, the term "reductone" is intended to cover sugar-derived post-rearrangement Maillard reactants and their natural and synthetic equivalents, including carbonyls and cyclic, aliphatic and alicyclic ketones.

Thus, the compositions of the invention are activated within the foodstuff, and so generate flavour compounds in situ. This improves the distribution of the flavour/aroma compounds throughout the foodstuff and ensures that volatiles (and other "top notes") are more effectively introduced into the flavour profile.

Moreover, the use of a reductone means that flavour generation develops quickly, because the (relatively slow) earliest stages of the Maillard reaction are effectively dispensed with. Thus, the provision of Maillard reaction downstream intermediates permits the Maillard reaction to begin within the food at a relatively advanced stage; the invention therefore provides a "shortcut" to the complex flavour/ aroma compounds which arise as end products of the Maillard reaction.

Thus, the invention finds particular utility in cooking processes where conditions are such that the Maillard reaction is not favoured. Such conditions may arise, for example, where cooking times are reduced. moisture levels are relatively high or when temperatures are reduced. It finds particular application in microwave cooking, where cooking times are usually too short (and moisture levels too high) to permit the Maillard reaction to proceed to the later stages of flavour/aroma generation.

The invention also finds particular utility in the preparation of fast foods, where again cooking times are relatively short (often involving grilling and/or microwave treatment). Thus, in preferred applications the compositions of the invention are used to promote roast meat flavours in hamburgers and other fast food meat (or meat substitute) products.

Although the use of Maillard reaction downstream intermediates means that a reaction within and associated with the Maillard reaction itself begins within the food at a relatively advanced stage, it has surprisingly been found that this does not significantly impair the quality of flavour/ aroma produced in the food. Thus, the precursors selected for use in the invention are such that they give rise to a satisfactorily broad range of products after entry into the Maillard reaction. This leads to a particularly rich flavour profile in the food.

The precursors react in the food to generate flavour/aroma compounds. Thus, the precursors inter-react in situ. Without wishing to be bound by any theory, it is thought that the precursors also react with endogenous chemicals present in the foodstuff, such as for example endogenous amino acids, peptides, carbohydrates, sugars and lipids.

The precursors used in the compositions of the invention maintain a reactive association after inclusion in the foodstuff. As used herein, the term "reactive association" defines a state in which the precursors can efficiently participate in one or more of the reactions associated with the Maillard reaction. Without maintenance of a reactive association, it has been found that the precursors do not effectively participate in flavour/aroma-generating Maillard reactions.

The reactive association need not be maintained indefinitely after incorporation in the foodstuff; rather, all that is required is that the precursors be reactively associated for a time period sufficient to permit initation of the Millard reaction (or activation of the flavour/aroma generating reactions). In this way, reaction products (including flavour and aroma compounds) that diffuse throughout the foodstuff during cooking are produced.

In preferred embodiments, the state of reactive association of the precursors after inclusion in the foodstuff is characterized inter alia by high local concentrations of each precursor after inclusion (relative to the concentrations in the bulk foodstuff) and/or a low local concentration of water in the vicinity of the precursors after inclusion (relative to that in the bulk foodstuff).

The reactive association of the precursors may be achieved by effectively establishing a plurality of discrete reaction cells within the bulk foodstuff, the conditions (e.g. pH, moisture level, concentration of precursors etc.) within the reaction cells being distinct from that of the bulk foodstuff. In such cases, the conditions within the reaction cells are selected so as to favour the Maillard reaction. For example, the moisture concentration may be selected to be low relative to the bulk foodstuff, the pH adjusted to favour the Maillard reaction while the concentration of each of the precursors may be high relative to their concentration in the bulk foodstuff.

Thus, the compositions of the invention are formulated so as to provide for the establishment of discrete microenvironments (the principal parameters of which may include inter alia pH, moisture level and precursor concentration) within a foodstuff in which they are incorporated, which microenvironments provide conditions suitable for activation and progress of one or more reactions encompassed by the Maillard reaction or which are designed to promote the efficient interaction of precursors and maximise flavour generation on heating. Thus, the invention may provide for the creation of microenvironments which allow the precursors to react to form the desired flavour compounds.

The above-described reactive association of the precursors after inclusion in the foodstuff may be maintained by any convenient means known to those skilled in the art. In preferred embodiments, the reactive association is maintained by use of: (a) a binding agent; and/or (b) a carrier matrix; and/or (c) an encapsulant; and/or (d) aggregation.

Binding agents for use in the invention may take any form, so long as they act to link, couple or bind the precursors together. Binding may be achieved by physical or chemical means.

Carrier matrices for use in the invention may also take any form, so long as they provide a vehicle that co-transports the precursors.

Likewise, encapsulants for use in the invention may be of any type, so long as they serve to provide a physical barrier to dispersal of the precursors when incorporated into a foodstuff.

In preferred embodiments, the binding agent, carrier matrix or encapsulant preferably comprises: (a) a fat or oil; and/or (b) a starch; and/or (c) a wax; and/or (d) a sugar, polysaccharide or non-starch polysaccharide; and/or (e) a high molecular weight polysaccharide; and/or (f) a protein (e.g. casein, collagen, gelatin and/or albumen); and/or (g) a chitosan; and/or (h) a cellulose or hemicellulose; and/or (i) a gum (e.g. guar, xanthan, gellan, and/or gum ghatti/karaya); and/or (j) pectin; and/or (k) alginate; and/or (l) a resin or rosin (e.g. shellac); and/or (m) a liposome.

The precursors for use in the invention may be aggregated by pelleting, spinning disc technology, extrusion, rolling, compaction, agglomeration or co-precipitation (for example, followed by size-reducing grating, pulverizing, chopping, milling or comminuting the aggregate).

When aggregated, the aggregation of the precursors after inclusion in the foodstuff is preferably maintained by aggregative physical forces, e.g. friction. For example, in cases where reactive association is maintained by compaction of a mixture of powdered precursor preparations, friction may be responsible for keeping the precursor preparations in a state of intimate physical association.

The sulphur source preferably comprises: hydrogen sulphide or a source thereof; methane thiol or a source thereof: a sulphur-containing amino acid (or mixture thereof), for example cysteine and/or methionine; thiamine; cystine; sodium sulphide; ammonium sulphide; ammonium polysulphide; onions or derivatives thereof; garlic or derivatives thereof; shallots or derivatives thereof; and/or egg or derivatives thereof.

The amino acid preferably comprises one or more of the naturally occurring amino acids.

The reductone preferably comprises a post-rearrangement Maillard reactant, which does not contain sulphur or nitrogen, for example a dehydration and/or fission derivative of an Amadori product.

The use of a non-sulphur-containing reductone ensures that the precursors of the invention enter the Millard reaction at a point prior to substitution with sulphur moieties or amino moieties from amino acids (e.g. ammonia, pyrazines, etc.). This promotes the generation of a wide variety of sulphur-containing or amino-derived products, and in the case where sulphur-containing products are produced this may improve the delivery of meat-like flavours/aromas.

Particularly preferred are compositions wherein the reductone comprises: (a) a furanone; and/or (b) a ketone; and/or (c) a pyrone; and/or (d) an aldehyde; and/or (e) a carbonyl (e.g. dicarbonyl) compound; and/or (f) isomaltol; and/or (g) maltol, and/or (h) pyruvaldehyde; and/or (i) hydroxyacetone; and/or (j) 3-deoxyglucosone; and/or (k) 5-hydroxy-5,6-dihydromaltol; and/or (l) 2,3-butanedione; and/or (m) 3-hydroxy-2-butanone.

The furanone for use in the invention may comprise: (a) 4-hydroxy-5-methyl-3(2H)-furanone; and/or (b) 2,5-dimethyl-4-hydroxy-3(2H)-furanone; and/or (c) 2-methyl-4, 5-dihydro-3(2H)-furanone; and/or (d) a 4-hydroxy-3(2H)-furanone; and/or (e) 4-methoxy-2,5-dimethyl-3(2H)-furanone.

The ketone for use in the invention may comprise: (a) 2-hydroxy-3-methyl-2-cyctopentenone (cyolotene); and/or (b) a cyclic ketone; and/or (c) an acyclic ketone.

The pyrone for use in the invention may comprise 3,5-dihydroxy-2-methyl-4H-pyran-4-one.

The precursors preferably react on heating to generate a flavour via pathways within or associated with the Maillard reaction, for example via a post-rearrangement Maillard reaction.

The precursors and binding agent, carrier matrix, encapsulant or aggregant may be combined by co-processing, for example by cryomilling, microencapsulation, extrusion, disk-pastellation, drum flaking, spray chilling, spray dying or spinning disc technology (for example, as described in WO 85/05288).

The composition may be in particulate, microparticulate, powder, flake or granular form, and the particles, microparticles, powder, flakes or granules may for example comprise (or consist essentially of) the precursors (optionally together with a binder, carrier matrix or encapsulant).

The water concentration of the composition is preferably selected so that, after incorporation into the foodstuff, the water concentration in the local environment of the dispersed composition is suitable for efficient activation and progress of the Maillard reaction. Thus, the optimum moisture content of the compositions of the invention depends inter alia on the moisture content (and other chemical/physical characteristics) of the food to which the composition is lobe added. This parameter is, however, readily determined by routine trial and error.

In preferred embodiments, the moisture content of the compositions of the invention is below 15%, for example below 14%, 13%, 12%, 11%, 10%, 9%, 8%, 7%, 6%, 5%, 4%, 3%, 2% or 1%. This promotes the activation (and the subsequent progress) of the Maillard reaction.

The composition may preferably further comprise a moisture barrier (e.g. an encapsulant), a dessicant or a hydrophobic agent. Such components help to ensure that moisture levels within the local environment of the dispersed composition in a foodstuff are low relative to the surrounding foodstuff (so promoting effective Maillard reaction and flavour development).

The flavour generated by the compositions of the invention may be: (a) a cooked (e.g. stewed, roasted, grilled or fried) meat (for example poultry (e.g. chicken), beef pork, ham, lamb or fish) flavour; (b) a savoury (e.g. cheese, onion or garlic) flavour; (c) a baked or toasted flavour, or (d) non-sweet.

The composition of the invention may be used with any foodstuff, including: (a) a meat or meat substitute; (b) a comminuted meat product (e.g. a burger); (c) a sauce; (d) a liquid gravy; (e) a dehydrated gravy base; (f) a batter (g) a breadcrumb; (h) a petfood; (i) a seasoning mix, e.g. for a burger or barbecue product; (j) a pre-dust; (k) a glaze; (l) a pasteurized foodstuff; (m) a retorted foodstuff; (n) a microwave product (e.g. a microwave meal); (o) a dehydrated meal base (e.g. being pasta- or noodle-based); or (p) a bread; or (q) a snackfood (e.g. crisps).

The precursors preferably react to generate the flavour on microwave heating, convection oven heating, grilling, impingement oven, infra red, extrusion, frying, stewing, toasting or the addition of hot water (e g. boiling water), on retorting and/or on pasteurization.

In another aspect, the invention contemplates a foodstuff (or food ingredient or food base) comprising the composition of the invention.

Also contemplated by the invention is a process for producing a composition for generating a cooked flavour in a foodstuff comprising the steps of: (a) providing a sulphur source or an amino acid; (b) providing a reductone (or a combination of two or more different reductones); (c) combining the sulphur source or amino acid and reductone(s) under conditions such that they maintain a reactive association after inclusion in a foodstuff.

Preferably, the combining step (c) comprises binding the sulphur source and/or the amino acid and reductone together.

The binding step preferably comprises: (a) co-encapsulating the sulphur source and/or amino acid and reductone, for example in a carrier (e.g. in a carrier comprising any of the components defined earlier); and/or (b) mixing the sulphur source and/or amino acid, reductone and a carrier (e.g. a carrier comprising any of the components (a)–(m) as defined earlier) and spray chilling or spray drying the mixture (e.g. by atomizing the mixture in a chamber and cooling the atomized mixture to form a powder); and/or (c) mixing the sulphur source or amino acid and reductone and a carrier (e.g. a carrier comprising any of the components (a)–(m) as defined earlier) and subjecting the mixture to disc pastellation, drum flaking, cryomilling, microencapsulation coating (e.g. fat coating), spinning disc treatment or extrusion.

The process preferably further comprises the step of size-reducing, grating, pulverizing, chopping, milling or comminuting the composition.

The process may further comprise the step of drying the composition, for example to below 15%, for example below 14%, 13%, 12%, 11%, 10%, 9%, 8%, 7%, 6%, 5%, 4%, 3%, 2% or 1% w/w water.

In another aspect, the invention contemplates a process for producing a foodstuff comprising the step of adding to a foodstuff the composition of the invention (for example by dusting or by inclusion, for example at an inclusion level of 0.01–10% (e.g. about 0.05–0.2%) w/w, optionally followed by heating (e.g. by convection cooking, impingement oven, infra red, extrusion, microwave cooking, addition of hot water, retorting or pasteurizing).

Also contemplated by the invention is a process for generating a cooked flavour comprising the steps of adding the composition of the invention to a foodstuff (for example by dusting or by inclusion, for example at an inclusion level of 0.01–1.0% (e.g. about 0.05–0.2%) w/w, followed by heating (e.g. by convection cooking, impingement over, infra red, extrusion, frying, microwave cooking, addition of hot water, retorting or pasteurizing).

As used herein, the term cooked flavour is intended to encompass those flavours normally produced when food is cooked (e.g. exposed to temperatures of above 100° C. for about 5 min or more). The term cooked meat flavour is intended to encompass those flavours normally produced when meat is cooked (e.g. exposed to temperatures of above 100° C. for about 5 min or more).

In preferred embodiments, the cooked flavours are those produced when a meat (e.g. chicken, pork, beef, lamb or ham) is broiled, stewed, grilled, barbecued or roasted.

As used herein, the term "flavour" as applied to a foodstuff includes its aroma, and may refer in general terms to the organoleptic qualities of the foodstuff. Indeed, those skilled in the art will recognize that the perceived flavour of any given food depends to a large extent on its aroma.

DETAILED DESCRIPTION OF THE INVENTION

The invention will now be described with reference to specific examples. These are for illustrative purposes only, and are not intended to be limiting in any way to the scope of the monopoly claimed or the invention described.

Example 1: Gravy product

A carrier was prepared by mixing modified starch and gum acacia at a ratio of 5:1. Cysteine hydrochloride and 4-methoxy-2,5-dimethyl-3(2H)-furanone at a ratio of 4:1 were then mixed (under conditions of high shear) with the carrier in the presence of excess water. The ratio of the carrier to the mixture of cysteine hydrochloride and 4-methoxy-2,5-dimethyl-3(2H)-furanone was 25:1.

The aqueous mixture was then spray dried, and the resulting powder incorporated into a standard dehydrated gravy base 0.15% w/w. The resulting gravy base could be added to water at 6% w/w and heated for 60 to 90 seconds in a microwave oven to produce a gravy having a meaty aroma and taste.

Example 2: Premixed gravy product

A dehydrated gravy base was produced as described in Example 1. The base was mixed with water at 6% w/w and the gravy was then enclosed in a jar, tetra pak or sachet and pasteurised in situ. The resulting gravy exhibits a developed meaty aroma immediately on opening the package.

Example 3: Seasoning mix

Cysteine hydrochloride, traditional soy sauce and enzyme modified pork fat were mixed in a ratio of 1:50:10. The components were then warmed to an extent just sufficient to melt the animal fat. A carrier compring modified starch in admixture with a cellulose derivative at a ratio of 10:1 was then added and the entire mixture homogenized and spray dried.

The spray dried product was then mixed with a sausage seasoning to an inclusion level of 0.4% w/w. The sausage product exhibited an enhanced aroma and flavour when cooked.

Example 4: Hamburger product

A carrier was prepared by mixing modified starch and a cellulose derivative at a ratio of 10:1. Cysteine hydrochloride and 4 hydroxy 5 methyl 2,3 dihydrofuran-3-one at a ratio of 5:1 were then mixed (under conditions of high shear) with the carrier in the presence of excess water. The ratio of the carrier to the mixture of cysteine hydrochloride and 4-hydroxy-5-methyl-3(2H)-furanone was 30:1.

The aqueous mixture was then spray dried, and the resulting powder incorporated into a comminuted meat hamburger mix at an inclusion level of 0.1% w/w. The burgers exhibited a full, rich meaty aroma after heating in a microwave oven.

Example 5: Dehydrated foodstuff

A flavouring composition prepared as described in Example 1 was added into: (a) the gravy mix; (b) the gel mix; (c) the meat matrix and (d) the chunk at 0.2% prior to canning. A meaty flavour/aroma developed in situ on retorting.

What is claimed is:

1. A composition for generating a cooked flavour when heating a foodstuff in which the composition is included, said composition comprising a combination of a sulphur source selected from the group consisting of hydrogen sulphide, methane thiol, a sulfur-containing amino acid, thiamine, cystine, sodium sulphide, ammonium sulphide, ammonium polysulphide, onions, garlic, shallots, eggs, methionine, and mixtures thereof and at least one reductone selected from the group consisting of a furanone, a ketone, a pyrone, an aldehyde, a carbonyl compound, isomaltol, maltol, pyruvaldehyde, hydroxyacetone, 3-deoxyglucosone, 5-hydroxy-5,6-dihydromaltol, 2,3-butanedione, 3-hydroxy-2-butanone, a process flavour, cooked vegetable concentrates, soy sauce, and mixtures thereof, wherein said combination has a moisture concentration below 15% and said combination is encapsulated with an encapsulant such that a reactive association of the combination is maintained after inclusion thereof in the foodstuff and a physical barrier to dispersal of the combination in the foodstuff is provided.

2. The composition of claim 1, wherein the reductone comprises a dehydration derivative of an Amadori or a Heyns rearrangement product.

3. The composition of claim 1, wherein the reductone comprises a fission derivative of an Amadori or a Heyns rearrangement product.

4. The composition of claim 1, wherein the reductone comprises a non-sulphur-containing post-rearrangement Maillard reactant.

5. The composition of claim 1, wherein the reductone is a furanone selected from the group consisting of:
 (a) 4-hydroxy-5-methyl-3(2H)-furanone;
 (b) 2,5-dimethyl-4-hydroxy-3(2H)-furanone;
 (c) 2-methyl-4,5-dihydro-3(2H)-furanone;
 (d) a 4-hydroxy-3(2H)-furanone; and
 (e) 4-methoxy-2,5-dimethyl-3(2H)-furanone.

6. The composition of claim 1, wherein the reductone is a ketone selected from the group consisting of:
 (a) 2-hydroxy-3-methyl-2-cyclopentenone cyclotene);
 (b) a cyclic ketone; and
 (c) an acyclic ketone.

7. The composition of claim 1, wherein the reducone is 3,5-dihydroxy-2-methyl-4H-pyran-4-one.

8. The composition of claim 1, wherein the encapsulant for the encapsulated combination is selected from the group consisting of: (a) a fat or oil; (b) a starch; (c) a wax; (d) a sugar; (e) a polysaccharide; (f) a protein; (g) a chitosan; (h) a cellulose or hemicellulose; (i) a gum; (j) a pectin: (k) an alginate; (l) a resin or rosin; and (m) a liposome.

9. The composition of claim 1, wherein there are high local concentrations of the combination relative to an overall concentration in a bulk of the foodstuff, and a low local concentration of water in a vicinity of the combination after such inclusion relative to that in the bulk foodstuff.

10. The composition of claim 1, wherein the combination reacts on heating to generate the flavour via a reaction within or associated with a Maillard reaction.

11. The composition of claim 1, wherein the encapsulated combination is in the form of a particulate, microparticulate, powder, flake or granular.

12. The composition of claim 1, wherein the encapsulated combination further has a hydrophobic agent.

13. The composition of claim 1, wherein the flavour is one or more of:
 (a) a cooked meat flavour;
 (b) a savory flavour; and
 (c) a baked or toasted flavour.

14. The composition of claim 1, wherein the foodstuff is selected from the group consisting of:
 (a) a meat or meat substitute;
 (b) a comminuted meat product;
 (c) a sauce;
 (d) a liquid gravy;
 (e) a dehydrated gravy base;
 (f) a batter;
 (g) a breadcrumb;
 (h) a petfood;
 (i) a seasoning mix;
 (j) a pre-dust;
 (k) a glaze;
 (l) a pasteurized foodstuff;
 (m) a retorted foodstuff;
 (n) a microwaveable product;
 (o) a dehydrated meal base;
 (p) a bread;
 (q) a snack food; and
 (r) mixtures thereof.

15. The composition of claim 1, wherein the combination reacts to generate the flavour on microwave heating, convection oven heating, grilling, stewing, toasting, an addition of hot water, retorting, and pasteurization.

16. A foodstuff comprising the combination of claim 1.

17. The composition of claim 1, wherein the sulfur source is cysteine hydrochloride and the reductone is a member selected from the group consisting of 4-methoxy-2,5-dimethyl-3(2H)-furanone, 4-hydroxy-5-methyl-3(2H)-furanone, and soy sauce.

* * * * *